(12) United States Patent
Yang

(10) Patent No.: US 11,457,046 B2
(45) Date of Patent: Sep. 27, 2022

(54) DISTRIBUTED NETWORK RESOURCE SECURITY ACCESS MANAGEMENT SYSTEM AND USER PORTAL

(71) Applicant: Hangzhou Jindoutengyun Technologies Co., Ltd., Hangzhou (CN)

(72) Inventor: Yang Yang, Hangzhou (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 17/535,731

(22) Filed: Nov. 26, 2021

(65) Prior Publication Data
US 2022/0182417 A1    Jun. 9, 2022

(30) Foreign Application Priority Data
Dec. 9, 2020    (CN) .......................... 202011425658.9

(51) Int. Cl.
*H04L 9/40*    (2022.01)
(52) U.S. Cl.
CPC .......... *H04L 63/20* (2013.01); *H04L 63/0218* (2013.01); *H04L 63/0227* (2013.01); *H04L 63/101* (2013.01); *H04L 63/102* (2013.01)
(58) Field of Classification Search
CPC ...... H04L 63/20; H04L 63/101; H04L 63/102
(Continued)

(56) References Cited

U.S. PATENT DOCUMENTS

| 8,079,089 B2 * | 12/2011 | Kakehi | G06F 21/10 713/193 |
| 8,526,352 B2 * | 9/2013 | Murphy | H04L 65/1016 370/312 |
| 2009/0265467 A1 | 10/2009 | Peles | |

FOREIGN PATENT DOCUMENTS

| CN | 107634948 A | 1/2018 |
| CN | 109194760 A | 1/2019 |

(Continued)

OTHER PUBLICATIONS

Huang Guanhua "Portal-based Multi-tenant Information Portal Platform Research and Implementation of Portal-based Multi-tenant Information Portal Platform" China Outstanding Master's Thesis Full Text Data Information Technology Series. 2014, (No. 1).

*Primary Examiner* — Anthony D Brown
(74) *Attorney, Agent, or Firm* — PROI Intellectual Property US; Klaus Michael Schmid

(57) ABSTRACT

The invention relates to the technical field of network security, in particular to a distributed network source security access management system and a user portal for reducing system security risks and improving system flexibility. The distributed network source security access management system includes a policy management module, a user management module, a user access module, a resource management module, and a resource access module. The resource management module is used for managing network resources and transmitting the network resource information and a connection relation between the network resources and the resource access module to the policy management module. The resource access module acquires user access module information and network resource information associated with the resource access module from the policy management module, receives a second access request, converts the second access request to generate a third access
(Continued)

request, and sends the third access request to a target network resource server.

7 Claims, 8 Drawing Sheets

(58) Field of Classification Search
USPC .......................................................... 726/1
See application file for complete search history.

(56) References Cited

FOREIGN PATENT DOCUMENTS

| CN | 110851274 A | 2/2020 |
| CN | 111552568 A | 8/2020 |

\* cited by examiner

DISTRIBUTED NETWORK RESOURCE SECURITY ACCESS MANAGEMENT SYSTEM AND USER PORTAL

BACKGROUND OF THE INVENTION

1. Technical Field

The invention relates to the technical field of network security, in particular to a distributed network resource security access management system and a user portal.

2. Description of Related Art

An existing network resource access control system typically consists of a management center 103 and an access gateway 105. As shown in FIG. 1, users access a network resource 107 by means of a user terminal 101 and the access gateway 105, and an administrator manages users, network resources, and access control policies at the management center 103.

The access gateway is a single point of failure and is also a focal point of security risks, thus having the following problems:

1. When the access gateway breaks down or is destroyed by hacker attacks, all users will be unable to access any network resources;
2. The access gateway stores all user, network resource, and access control policy information, so all data will leak if the access gateway has technical or management vulnerabilities;
3. Once the access gateway is attacked or infiltrated by hackers, all network resources will be exposed to risk.

In addition, all users are connected to the system by means of one portal (the access gateway), and all resources have to be accessed by means of the same source (the access gateway), so the deployment of the whole system has specific requirements for the network structure, is not flexible enough, and affects the actual usage experience of users.

BRIEF SUMMARY OF THE INVENTION

The objective of the invention is to solve the above-mentioned problems by providing a distributed network resource security access management system and a user portal to reduce system security risks and improve system flexibility.

To fulfill the above objective, the invention is implemented by means of the following technical solution:

In one aspect, the invention provides a distributed network resource security access management system, comprising: a policy management module, a user management module, a user access module, a resource management module, and a resource access module, wherein:

The policy management module is in a communication connection with the user management module, the user access module, the resource management module, and the resource access module, and is used for managing policy information for users to access network resources;

The user management module is used for managing user information (for example, adding, deleting, changing, and querying the user information) and transmitting the user information to the policy management module;

The user access module acquires user information, resource access module information and policy information associated with the user access module, as well as a connection relation between the resource access module and the network resources, from the policy management module, receives a first access request for a target network resource initiated by a user by means of a user terminal, converts the first access request according to the connection relation to generate a second access request, and transmits the second access request to the corresponding resource access module;

The resource management module is used for managing the network resources (such as adding, deleting, changing, and querying network resource information), and transmitting the network resource information and the connection relation between the network resources and the resource access module to the policy management module;

The resource access module acquires user access module information and network resource information associated with the resource access module from the policy management module, receives the second access request, converts the second access request to generate a third access request, and then sends the third access request to a target network resource server.

Preferably, the resource access module is also used for receiving response information returned by the target network resource server according to the third access request, converting the response information, and then reversely transmitting converted response information to the user access module according to a transmission route of the second access request;

The user access module is also used for receiving response information for the second access request from the resource access module, converting the response information, and then reversely transmitting converted response information to the user terminal according to a transmission route of the first access request.

Preferably, the user access module receives a first access request for a target network resource initiated by a user by means of a user terminal and converts the first access request according to the connection relation to generate a second access request, specifically comprising:

Receiving the first access request, and acquiring first access request information;

Determining resource access module information and route information corresponding to the target network resource corresponding to the first access request according to the connection relation between the resource access module and the network resources under the condition where it is determined that the first access request is allowed to be accessed according to the policy information, and converting the first access request information according to the determined information to generate second access request information; and Generating the second access request according to the second access request information.

Preferably, the policy information consists of at least one access rule; and contents of the access rule determine whether the first access request is allowed or rejected according to one or more of user information, user access module information, target network resource information, resource access module information which is associated with the target network source, and current environmental information (such as date or time).

Preferably, the resource access module converts the second access request to generate a third access request, specifically comprising:

Acquiring second access request information;

Determining one or more contents of an actual address, a request method and a processing logic of the target network resource corresponding to the second access request according to the connection relation between the resource access module and the network resources, and converting the second access request information according to the determined one or more contents to generate third access request information; and Generating the third access request according to the third access request information.

In the other aspect, the invention provides a user portal, comprising: a user management module and a user access module, wherein:

The user management module is used for managing user information and transmitting the user information to a policy management module;

The user access module acquires user information, resource access module information and policy information associated with the user access module, as well as a connection relation between the resource access module and network resources, from the policy management module, receives a first access request for a target network resource initiated by a user by means of a user terminal, converts the first access request according to the connection relation to generate a second access request, and transmits the second access request to a corresponding resource access module;

Preferably, the user access module is also used for receiving response information for the second access request from the resource access module, converting the response information, and reversely transmitting converted response information to the user terminal according to a transmission route of the first access request.

Preferably, the user access module receives a first access request for a target network resource initiated by a user by means of a user terminal and converts the first access request according to the connection relation to generate a second access request, specifically comprising:

Receiving the first access request, and acquiring first access request information;

Determining resource access module information and route information corresponding to the target network resource corresponding to the first access request according to the connection relation between the resource access module and the network resources under the condition where it is determined that the first access request is allowed to be accessed according to the policy information, and converting the first access request information according to the determined information to generate second access request information; and Generating the second access request according to the second access request information.

Preferably, the policy information consists of at least one access rule; and contents of the access rule determine whether the first access request is allowed or rejected according to one or more of user information, user access module information, target network resource information, resource access module information which is associated with the target network source, and current environmental information (such as date or time).

The invention has the following beneficial effects:

1. Multiple user access modules may be configured according to actual positions of users and resources, so that users at different positions may access the nearest user access module; multiple resource access modules may be configured, so that users can access resources at different positions, and the system deployment is more flexible. If the positions of the users and the user terminal change, the user terminal may be connected to the nearest user access module, so that the access experience of the users is improved.

2. The system adopts a distributed architecture to eliminate a single point of failure, so that when a fault happens, the influence of the fault can be greatly reduced.

3. Multiple modules (the policy management module, the user management module, the user access module, the resource management module, and the resource access module) of the system operate separately, so that even if hackers invade part of these modules, they cannot access target resources or will not cause leaking of important information, thus greatly reducing security risks of the system.

4. By adoption of a three-stage access architecture of user terminal-user access module, user access module-resource access module, and resource access module-network resource, users can obtain the experience of directly accessing network resources by means of a user terminal, and the users/user terminal and the user access module cannot obtain specific information, including network addresses, of the network resources, so that malicious users or hackers cannot infiltrate or attack the network resources; an access request received by network resources is formed after an access request initiated by users by means of the user terminal is processed twice by the user access module and the resource access module, so that the network resources are effectively protected from receiving harmful requests or requests that may cause information leaking; and a response received by the user terminal is formed after a response sent by the network resources is processed twice by the resource access module and the user access module, so that the user terminal is effectively protected from receiving harmful responses or responses that may cause information leaking.

5. In this system architecture, the user access module is merely associated with the corresponding user terminal and resource access module, and will not obtain actual information of a target network resource that the user access module finally accesses, and similarly, the resource access module is merely associated with the corresponding network resource and user access module, and will not obtain user terminal information of the network resource accessed by means of the resource access module, so that the safety of the system is improved.

6. In this system architecture, the user management module is separated from the user access module, and the resource management module is separated from the resource access module, so that the system stability is improved, and the deployment and management flexibility is also improved.

7. In this system architecture, the user access module is connected to the resource access module merely for the purpose of transmitting resource access requests and responses, and the user access module and the resource access module obtain information from each other and relevant network source information by means of the policy management module, so that the protection of network resources is further enhanced.

DETAILED DESCRIPTION OF THE INVENTION

To better clarify the purposes, technical solutions, and advantages of the embodiments of the invention, a clear and complete description will be given below in conjunction with the technical solutions of the embodiments of the invention. Obviously, the embodiments in the following description are merely illustrative ones, and are not all possible ones of the invention. All other embodiments obtained by those ordinarily skilled in the art based on the following ones without creative labor should also fall within the protection scope of the invention.

This embodiment provides a distributed network resource security access management system, all modules of which can be managed separately, so that an attack on one module by a hacker cannot be directly copied to other modules. 1. If one user access module is controlled by a hacker, the hacker cannot obtain information and records of other user access modules and resource access modules, can only check the basic information of a user who accesses resources by means of the user access module controlled by the hacker, and a resource access module and target network resource accessed by the user, and cannot conduct further destruction before finding out the vulnerabilities of other user access modules and resource access modules. If the user who accesses resources by means of the user access module controlled by the hacker did not access a certain resource access module, the hacker will be unable to carry out further information collection, connection and attack, so the influence caused by the hacker is limited to the user who accesses resources by means of the user access module controlled by the hacker, and will not spread to users corresponding to other user access modules or target resources of the system. 2. Similarly, if one resource access module is controlled by a hacker, the hacker can only check the basic information of a user access module that accesses resources by means of the resource access module, and a target network resource, so the influence caused by the hacker is limited to resources accessed by means of the resource access module controlled by the hacker, and will not spread to resources of other resource access modules or users of the system. 3. A policy management module does not participate in data communication in the access process, and has no direct association with the communication route of user-user access module-resource access module-resource, so even if the policy management module is controlled by a hacker, the hacker can only destroy the deployment of the system and exert an influence on access of users to target network resources, and will not cause direct losses or data leakages to users or resources in the system.

Figure 1:
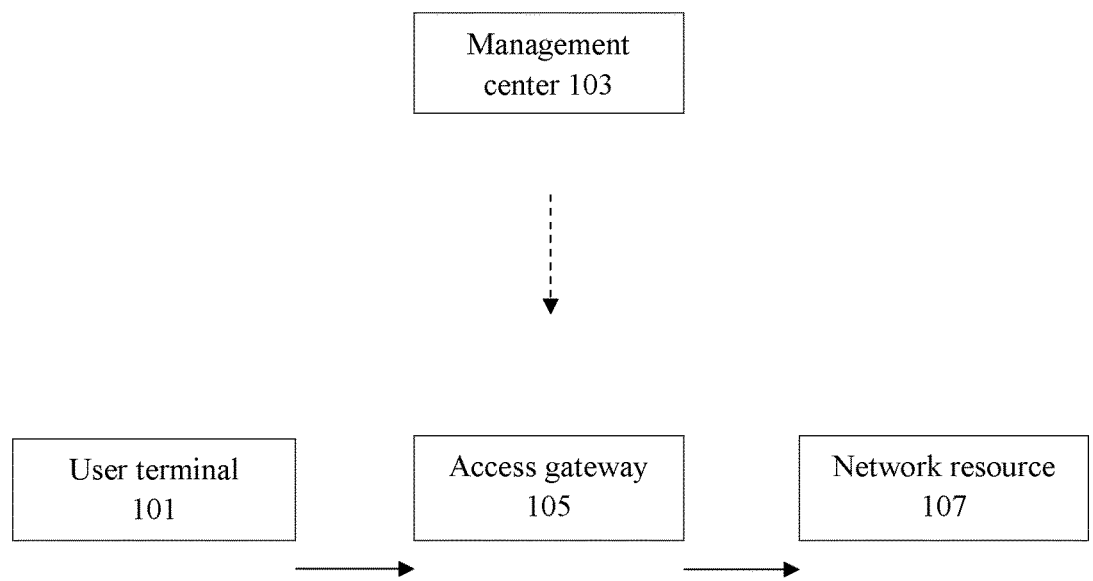
FIG. 1 is framework diagram of an existing network resource access control system.
Figure 2:
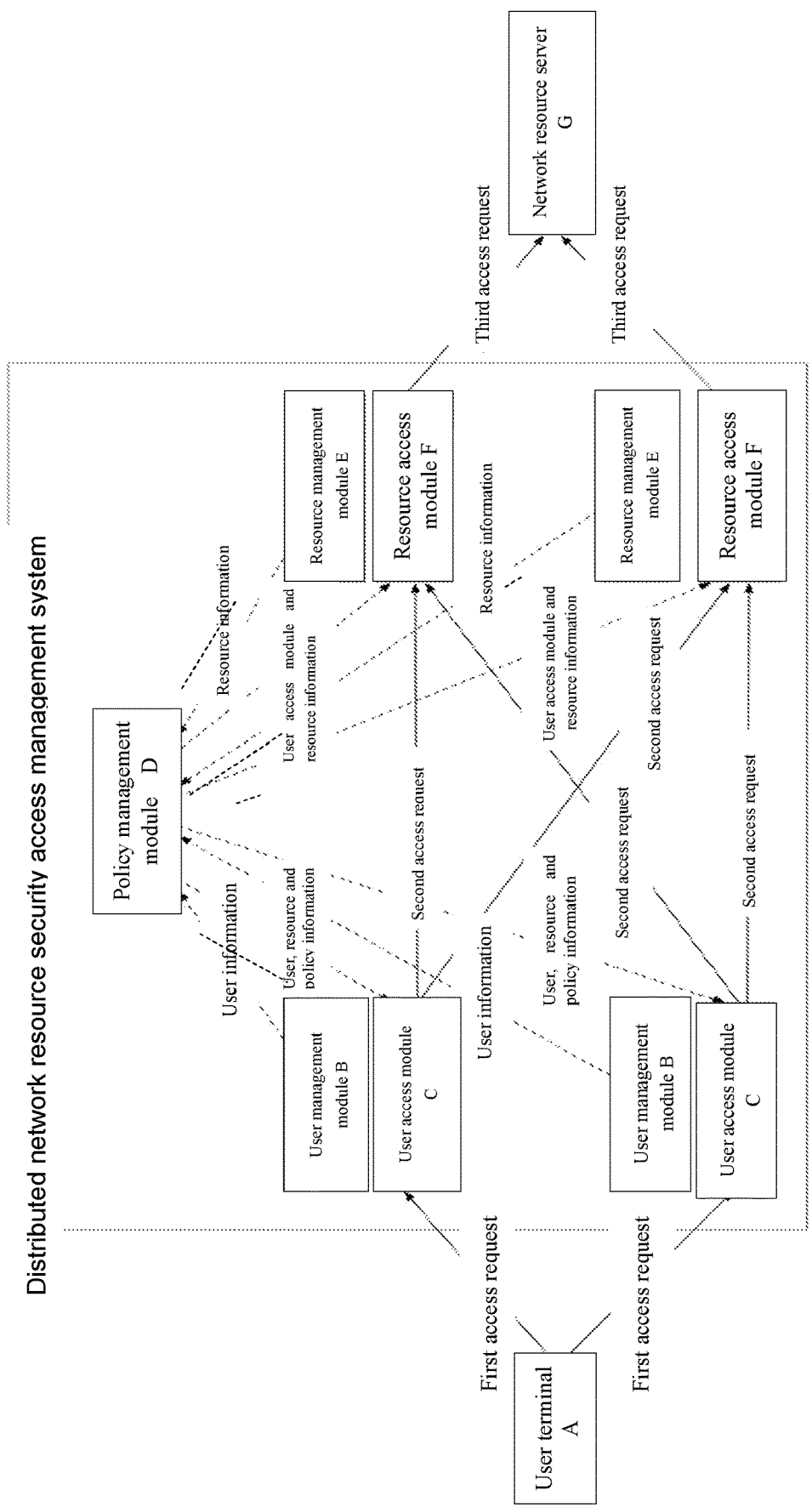
FIG. 2 is a framework diagram of a distributed network resource security access management system according to the invention.

As shown in FIG. 2, the distributed network resource security access management system in this embodiment comprises a policy management module D, a user management module B, a user access module C, a resource management module E, and a resource access module F.

Figure 3:
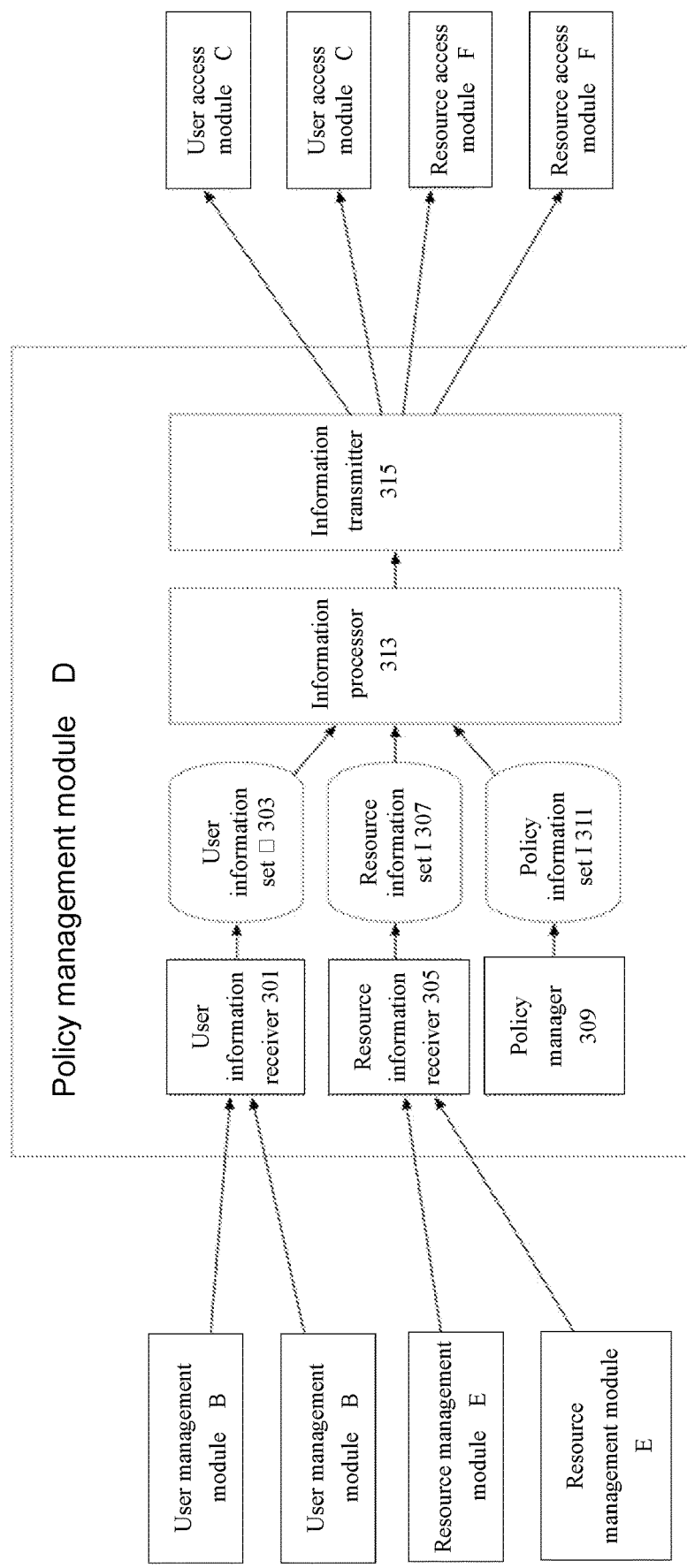
FIG. 3 is a detailed diagram of a policy management module of the distributed network resource security access management system according to the invention.

The policy management module D is in a communication connection with the user management module B, the user access module C, the resource management module E, and the resource access module F, and is used for managing policy information for users to access network resources. As shown in FIG. 3, the policy management module D in this embodiment comprises a user information receiver 301 used for receiving user information from the user management module B and updating the received user information into a user information set I 303; a resource information receiver 305 used for receiving network resource information from the resource management module E and a connection relation between the network resources and the resource access module, and updating the received information into a resource information set I 307; a policy manager 309 used for managing (including adding, deleting, changing, and querying) a policy information set I 311; and an information processor 313 used for acquiring user information, resource information (including the connection relation between the network resources and the resource access module), and policy information from the user information set I 303, the resource information set I 307 and the policy information set I 311, transmitting the user information, resource access module and policy information associated with the user access module, as well as the connection relation between the resource access module (the resource access module associated with the user access module) and the network resources to the user access module C by means of an information transmitter 315, to make an access rule (for example, users meeting condition A may access network resources meeting condition AAA under environmental condition AA), and transmitting the user access module and network work source information associated with the resource access module to the resource access module F by means of the information transmitter 315.

To facilitate understanding, examples are given here to explain the user information, the resource information and the policy information.

The user information is:

User a: the value of parameter aa is 11, and the value of parameter ab is 22;

User b: the value of parameter aa is 12, and the value of parameter ab is 22;

The resource information is:

Resource i: the value of parameter bb is 99, and the value of parameter ba is 88;

Resource ii: the value of parameter bb is 98, and the value of parameter ba is 87;

The policy information consists of at least one access rule; and the contents of the access rule determine whether an access request is allowed or rejected according one or more of user information, user access module information, target network resource information, resource access module information which is associated with the target network resource, and current environmental information (such as date or time). For example:

Rule 1: users meeting condition A (the value of parameter aa is greater than 10) can access resources meeting condition AAA (the value of parameter bb is less than 100) under environmental condition AA (before Dec. 1, 2020);

Rule 2: users meeting condition B (the value of parameter ab is equal to 22) can access resources meeting condition BBB (the value of parameter ba is equal to 88) under environmental condition BB (after May 3, 2020).

Contents sent to the user accesses module B by the policy management module D may be all or part of the user information (only information of user a, or only information of a certain parameter of users such as information of parameter aa), all or part of the resource information (only information of resource i, or only information of a certain parameter of resources such as information of parameter bb), and all or part of the policy information.

Figure 4:
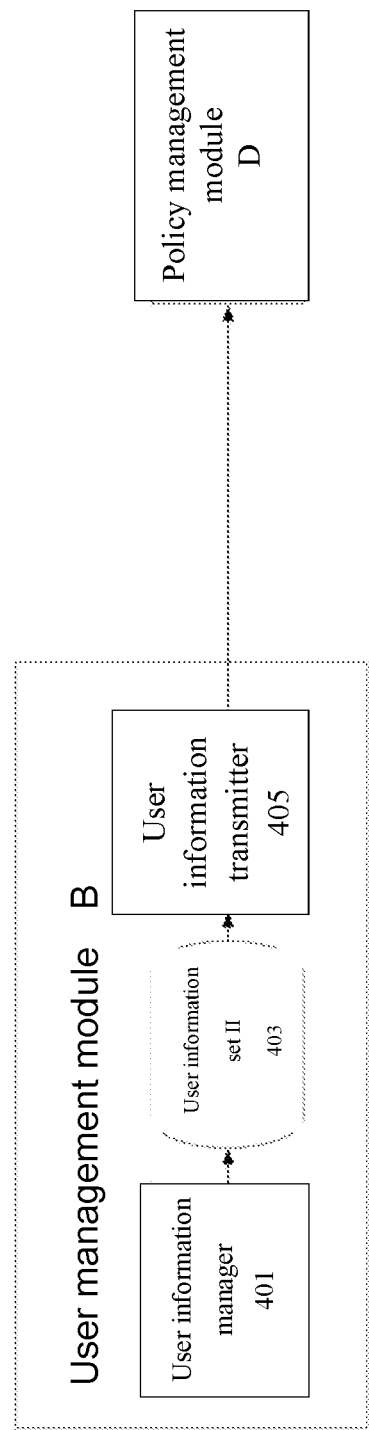
FIG. 4 is a detailed diagram of a user management module of the distributed network resource security access management system according to the invention.

The user management module B is located on a user side, and is used for managing user information (such as adding, deleting, changing, and querying the user information) and transmitting the user information to the policy management module D. As shown in FIG. 4, the user management module B in this embodiment comprises a user information manager 401, a user information set II 403, and a user information transmitter 405, wherein the user information manager 401 is used for adding, deleting, changing, and querying the user information, and updating modified user information into the user information set II 403; the user information set II 403 is used for storing the user information; and the user information transmitter 405 is used for transmitting the user information stored in the user information set II 403 to the policy management module D.

The user access module C is located on the user side and is in a communication connection with a user terminal A (including intelligent hardware such as a smartphone, a computer, or a tablet computer). Multiple user access modules C may be configured as required by the circumstances to allow users at different positions to access the nearest ones or to provide standbys (for example, when one user access module breaks down and does not support user access, users may access network resources by means of other user access modules). The user access module C acquires the user information, resource access module and policy information associated with the user access module, as well as the connection relation between the resource access module (the resource access module associated with the user access module) and the network resources, from the policy management module D, receives a first access request for a target network source initiated by a user by means of the user terminal, acquires first access request information, determines resource access module information and route information corresponding to the target network resource corresponding to the first access request according to the connection relation between the resource access module and the network resources under the condition where it is determined that the first access request is allowed to be accessed according to the policy information, converts the first access request information according to the determined information to generate second access request information, and generates a second access request according to the second access request information.

Figure 5:
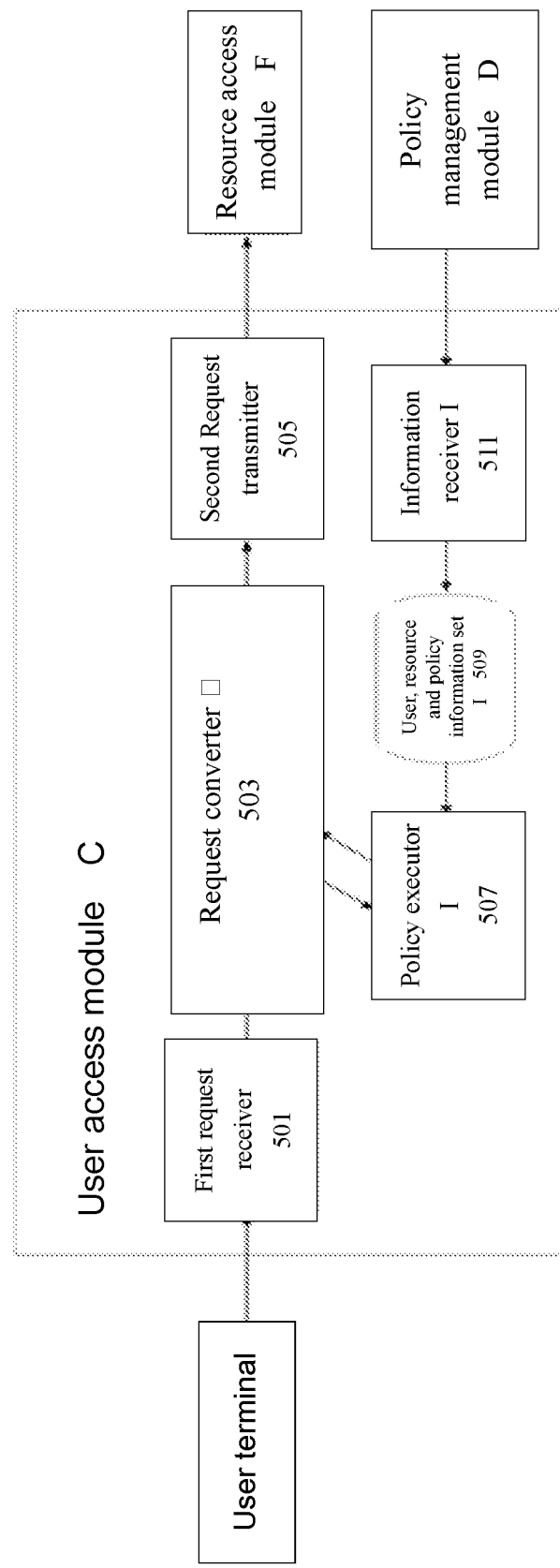
FIG. 5 is a detailed diagram of a user access module of the distributed network resource security access management system according to the invention.

As shown in FIG. 5, the user access module C in this embodiment comprises a first request receiver 501, a request converter I 503, a second request transmitter 505, a policy executor I 507, a user, resource and policy information set I 509, and an information receiver I 511. Wherein, the information receiver I 511 acquires the user information, resource access module and policy information associated with the user access module, as well as the connection relation between the resource access module and the network resources, from the policy management module D, and stores the user information, resource access module and policy information associated with the user access module, as well as the connection relation between the resource access module and the network resources in the user, resource and policy information set I 509; the first request receiver 501 receives the first access request, acquires the first access request information, and then transmits the first access request information to the request converter I 503; the request converter I 503 transmits the first access request information to the policy executor I 507; the policy executor I 507 acquires the user information, resource access module and policy information associated with the user access module, as well as the connection relation between the resource access module and the network resources, from the user, resource and policy information set I 509, determines whether the first access request is allowed or rejected according to relevant information in the first access request information (such as the user information, the target network resource, and the environmental information), returns rejected access information to the request converter I 503 if the first access request is rejected, and returns allowable access information to the request converter I 503 if the first access request is allowed to be accessed; and the request converter I 503 determines resource access module information and route information corresponding to the target network resource corresponding to the first access request according to the connection relation between the resource access module and the network resources after receiving the allowable access information, converts the first access request information according to the determined information to generate second access request information, and sends the second access request information to the second request transmitter 505; and the second request transmitter 505 encapsulates the second access request information (for example, by adding information for network transmission such as a network communication transmission format or conversation information) to generate a corresponding second access request, and sends the second access request to the corresponding resource access module F.

Figure 6:
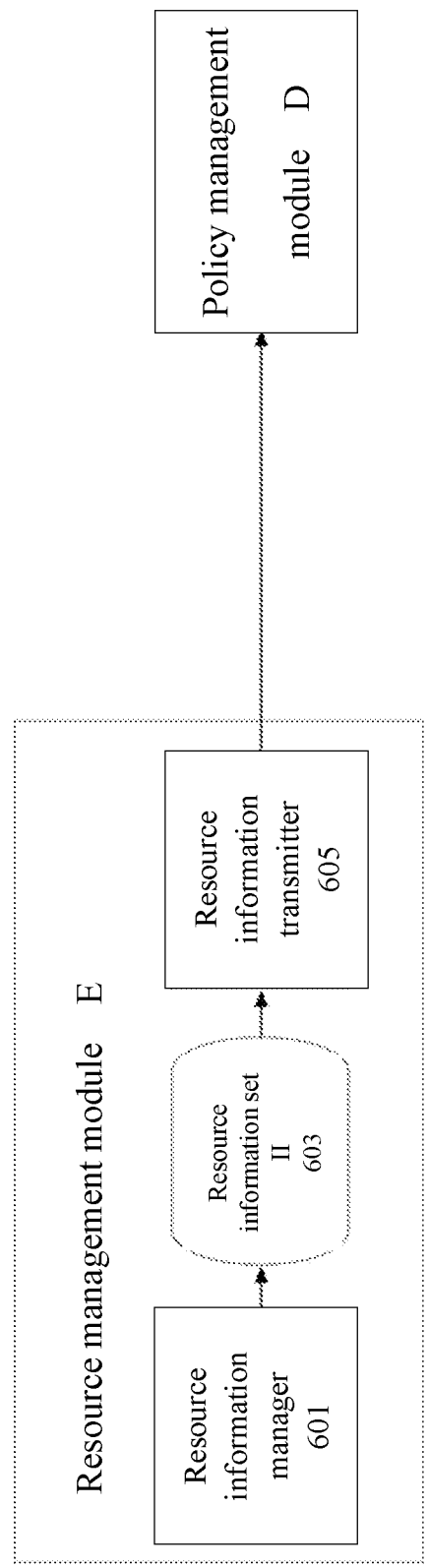
FIG. 6 is a detailed diagram of a resource management module of the network resource security access management system according to the invention.

The resource management module E is located on a resource side, and is used for managing network resources (such as adding, deleting, changing, and querying resource information) and transmitting the network resource information and the connection relation between the network resources and the resource management module to the policy management module D. As shown in FIG. 6, the resource management module E in this embodiment comprises a resource information manager 601, a resource information set II 603, and a resource information transmitter 605, wherein the resource information manager 601 is used for adding, deleting, changing, and querying the resource information, and updating modified resource information and the connection relation between the network resource and the resource access module to the resource information set II 603; the resource information set II 603 is used for storing the resource information and the connection relation between the network resource and the resource access modules; and the resource information transmitter 605 is used for transmitting the resource information stored in the resource information set II 603 and the connection relation between the network resources and the resource access module to the policy management module D.

Figure 7:
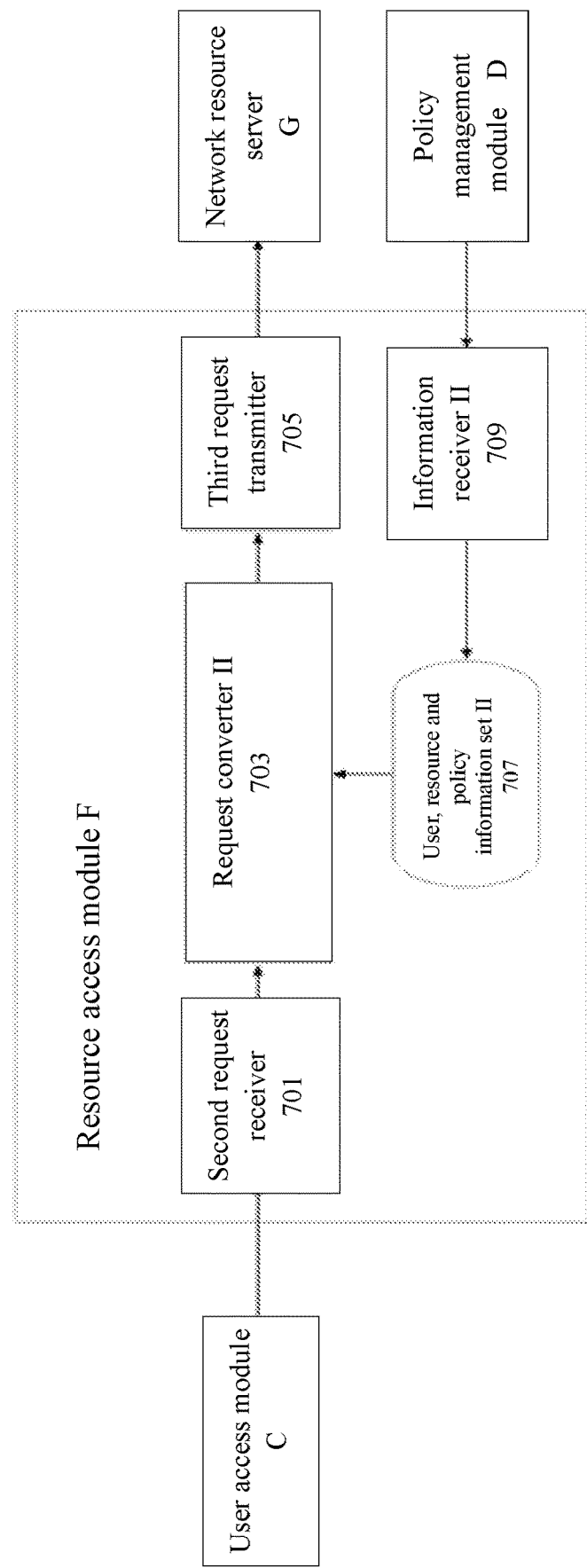
FIG. 7 is a detailed diagram of a resource access module of the network resource security access management system according to the invention.

The resource access module F is located on the resource side, and is in a communication connection with the network resources. Multiple resource access modules F may be configured as required by the circumstance to allow users to access resources at different geographic positions or to provide standbys (for example, when one resource access module breaks down and does not support user access, users can access a target network resource by means of another resource access module under the precondition where these two resource access modules are both connected to the target network resource). In one aspect, the resource access module F acquires the user access module and network resource information associated with the resource access module from the policy management module D. In the other aspect, the resource access module F receives the second access request, converts the second access request to generate a third access request, and then sends the third access request to a target network resource server G. Specifically, the second access request information is acquired; one or more contents of an actual address, a request method, and a processing logic of the target network resource corresponding to the second access request are determined according to the connection relation between the resource access module and the network resources, and the second access request information is converted according to the determined one or more contents to generate third access request information; and the third access request is generated according to the third access request and is sent to the target network resource server G. As shown in FIG. 7, the resource access module F in this embodiment comprises a second request receiver 701, a request converter II 703, a third request transmitter 705, a user, resource and policy information set II 707, and an information receiver II 709. Wherein, the information receiver II 709 receives the user access module and network resource information associated with the resource access module from the policy management module D, and stores the user access module and network resource information associated with the resource access module in the user, resource and policy information set II 707; the second request receiver 701 receives the second access request, acquires second access request information, and then transmits the second access request information to the request converter II 703; the request converter II 703 acquires the user access module and network resource information associated with the resource access module from the user, resource and policy information set II 707, determines one or more contents of an actual address, a request method and a processing logic of the target network resource corresponding to the second access request according to the connection relation between the resource access module and the network resources, converts the second access request information according to the determined one or more contents to generate third access request information, and sends the third access request information to the third request transmitter 705; and the third request transmitter 705 encapsulates the third access request information (for example, by adding information for network transmission such as a network communication transmission format or conversation information) to generate a corresponding third access request, and sends the third access request to the target network resource server.

As a preferred implementation of this embodiment, to realize a closed loop of network resource access, The resource access module F is also used for receiving response information returned by the target network resource server G according to the third access request, converting the response information, and then reversely transmitting the converted response information to the user access module C according to a transmission route of the second access request.

Specifically, the resource access module F acquires response information (returned according to the third access request and referred to as first response information), discards illegal response information (including fake or suspicious response information such as outdated or repetitive response information) from the response information, then presents received information by means of a corresponding presentation tool (such as the Chrome browser) according to the type of the target network resource, or the data type and contents of the response information, performs projection according to presented contents to generate information of an image code format, that is used as contents of converted response information (referred to as second response information), acquires route information of the user access module corresponding to the response information (returned according to the third access request) according to a route opposite to the transmission route of the second access request, and obtains converted response information (referred to as second response information) according to contents of the second response information and the acquired route information. Or, the resource access module F acquires response information (returned according to the third access request and referred to as first response information), discards illegal response information (including fake or suspicious response information such as outdated or repetitive response information) from the response information, then acquires route information of the user access module corresponding to the response information (returned according to the third access request) according to a route opposite to the transmission route of the second access request, and obtains converted response information (referred to as second response information) according to the response information having the illegal response information being discarded therefrom, and the acquired route information.

The user access module C is also used for receiving response information for the second access request from the resource access module F, converting the response information, and then reversely transmitting the converted response information to the user terminal A according to a transmission route of the first access request. Specifically, the user access module C acquires response information (to the second access request from the resource access module F, referred to as second response information), discards illegal response information (including fake or suspicious response information such as outdated or repetitive response information) from the response information, then acquires route information of the user terminal corresponding to the second response information according to a route opposite to the transmission route of the first access request, and obtains converted response information (referred to as third response information) according to the second response information and the obtained route information.

Figure 8:
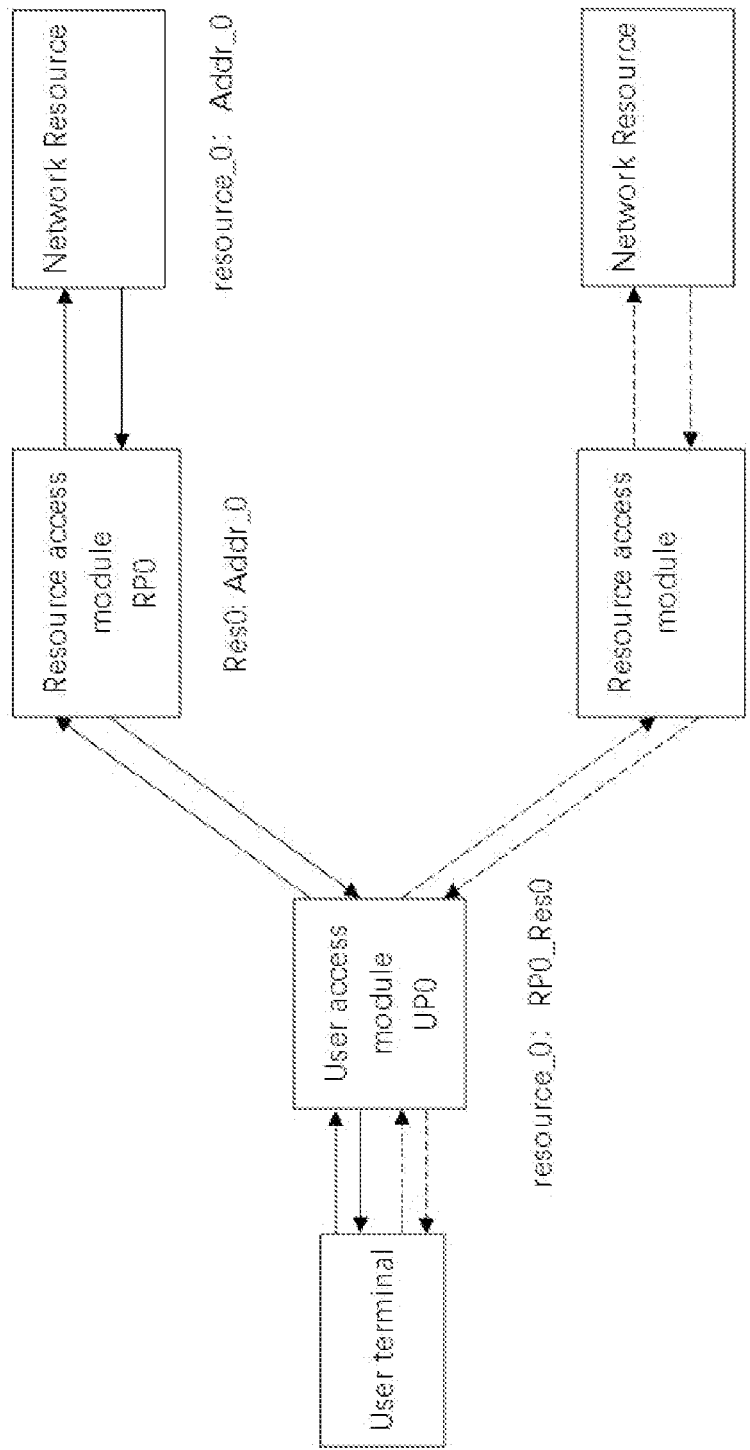
FIG. 8 is an illustrative diagram of access processing of the system according to the invention.

The specific implementation of the whole access process will be explained with an example in conjunction with FIG. 8:

a, a user sends a first access request to a user access module UP0 by means of a user terminal to request to access a first network resource (resource_0);

b, after receiving the first access request, the user access module UP0 obtains route information RP0_Res0 of the first network resource according to a corresponding relationship between the first network resource (resource_0) and a resource access module (a first corresponding relationship), wherein resource_0: RP0_Res0 in FIG. 8 means that, for the user access module UP0, the user accesses the first network resource (resource_0) by means of RP0_Res0;

c, the user access module UP0 generates a second access request to the resource access module RP0, and sends the second access request to the resource access module RP0 to request to access the first network resource (resource_0);

d, the resource access module RP0 receives the second access request, obtains an actual address Addr_0 and a resource type Web application of the first network resource (resource_0) according to a corresponding relationship between the first network resource (resource_0) and the resource access module RP0 (a second corresponding relationship), and logs in by means of a default account to access the first network resource (resource_0), wherein Res0: Addr_0 in FIG. 8 means that, for the resource access module RP0, the actual access address of the access request to Res0 is Addr_0;

e, the resource access module RP0 invokes a browser corresponding to the Web application (such as the Chrome browser) to generate a third access request to the first network resource (resource_0) with the address Addr_0 and completing the log-in logic by means of the default account, and sends the third access request to the first network resource resource_0 with the address Addr_0;

f, the first network resource resource_0 with the address Addr_0 returns first response information to the resource access module RP0;

g, after receiving the first response information, the resource access module RP0 processes contents of the first response information to generate second response information for the second access request, and sends the second response information to the user access module UP0;

h, after receiving the second response information, the user access module UP0 processes contents of the second response information to generate third response information for the first access request, and sends the third response information to the user terminal;

Processing in Step g and Step h comprises: presenting (rendering) the first response information or the second response information by means of a corresponding presentation tool (such as the Chrome browser) according to the type of a target network resource or the data type and contents of the response information, generating information of an image code format by projection or drawing according to presented contents, and using the information of the image code format as contents of the second response information or third response information. It is a projection picture of the network resource, that does not contain any actual information (such as the location or contents) of the network resource, rather than a true interface of the network resource that the user actually accesses (sees and operates), such that the network security is improved without affecting the actual experience of the user.

If the user access module UP0 is overloaded or breaks down, the system may be configured or adjusted to realize access to network resources by means of other user access modules; similarly, if the resource access module RP0 is overloaded or breaks down, the system may be configured or adjusted to realize access to network resources by means of other resource access modules, as long as target network resources can be accurately accessed, so that the stability and reliability of the system are improved.

For the sake of a good understanding, the corresponding relationship between the first network resource (resource_0) and the resource access module (the first corresponding relationship) in step b, and the relationship between the first network resource (resource_0) and the resource access module RP0 (the second corresponding relationship) in step d are explained as follows:

The first corresponding relationship is a corresponding relationship between resource identifiers in the user access module and actual resource contents, and the second corresponding relationship is a corresponding relationship between resource identifiers in the resource access module and actual resource contents. For example, the user access module is in a communication connection with a resource access module RP1 and a resource access module RP2, the resource access module RP1 is associated with two network resources aaa and aab, and the resource access module RP2 is also associated with two network resources aaa and aab, so an accessible resource list of the user access module contains four network resources named res_1, res_2, res_3, and res_4, respectively. Wherein, the first corresponding relationship is as follows: res_1 corresponds to the resource aaa accessible via the resource access module RP1; res_2 corresponds to the resource aab accessible via the resource access module RP1; res_3 corresponds to the resource aaa accessible via the resource access module RP2; res_4 corresponds to the resource aab accessible via the resource access module RP2. The second corresponding relationship is as follows: in the resource access module RP1, res_1 corresponds to the resource aaa, and res_2 corresponds to the resource aab; and in the resource access module RP2, res_3 corresponds to the resource aaa, and res_4 corresponds to the resource aab.

In actual application, the policy management module of the security access management system of the invention may be in a communication connection with one or more user management modules, user access modules, resource management modules and resource access modules; the user management module may be in a communication connection with one or more policy management modules; the user access module may be in a communication connection with one or more policy management modules and one or more resource access modules; the resource management module may be in a communication connection with one or more policy management modules; and the resource access module may be in a communication connection with one or more policy management modules and one or more user access modules.

A user portal comprises: a user management module B and a user access module C, wherein:

The user management module B is located on a user side, and is used for managing user information (such as adding, deleting, changing, and querying the user information) and transmitting the user information to a policy management module D. As shown in FIG. 4, the user management module B in this embodiment comprises a user information manager 401, a user information set II 403, and a user information transmitter 405, wherein the user information manager 401 is used for adding, deleting, changing, and querying the user information and updating modified user information into the user information set II 403; the user information set II 403 is used for storing the user information; and the user information transmitter 405 is used for transmitting the user information stored in the user information set II 403 to the policy management module D.

The user access module C is located on a user side, and is in a communication connection with a user terminal A (including intelligent hardware such as a smartphone, a computer, or a tablet computer). Multiple user access modules C may be configured as required by the circumstances to allow users at different positions to access the nearest ones or to provide standbys (for example, when one user access module breaks down and does not support user access, users may access network resources by means of other user access modules). The user access module C acquires user information, a resource access module and policy information associated with the user access module, as well as a connection relation between the resource access module (the resource access module associated with the user access module) and the network resources, from the policy management module D, receives a first access request for a target network source initiated by a user by means of the user terminal, acquires first access request information, determines resource access module information and route information corresponding to the target network resource corresponding to the first access request according to the connection relation between the resource access module and the network resources under the condition where it is determined that the first access request is allowed to be accessed according to the policy information, converts the first access request information according to the determined information to generate second access request information, and generates a second access request according to the second access request information.

As shown in FIG. 5, the user access module C in this embodiment comprises a first request receiver 501, a request converter I 503, a second request transmitter 505, a policy executor I 507, a user, resource and policy information set I 509, and an information receiver I 511. Wherein, the information receiver I 511 acquires the user information, resource access module and policy information associated with the user access module, as well as the connection relation between the resource access module and the network resources, from the policy management module D, and stores the user information, resource access module and policy information associated with the user access module, as well as the connection relation between the resource access module and the network resources in the user, resource and policy information set I 509; the first request receiver 501 receives the first access request, acquires the first access request information, and then transmits the first access request information to the request converter I 503; the request converter I 503 transmits the first access request information to the policy executor I 507; the policy executor I 507 acquires the user information, resource access module and policy information associated with the user access module, as well as the connection relation between the resource access module and the network resources, from the user, resource and policy information set I 509, determines whether the first access request is allowed or rejected according to relevant information in the first access request information (such as the user information, the target network resource and the environmental information), returns rejected access information to the request converter I 503 if the first access request is rejected, and returns allowable access information to the request converter I 503 if the first access request is allowed to be accessed; and the request converter I 503 determines resource access module information and route information corresponding to the target network resource corresponding to the first access request according to the connection relation between the resource access module and the network resources after receiving the allowable access information, converts the first access request information according to the determined information to generate second access request information, and sends the second access request information to the second request transmitter 505; and the second request transmitter 505 encapsulates the second access request information (for example, by adding information for network transmission such as a network communication transmission format or conversation information) to generate a corresponding second access request, and sends the second access request to the corresponding resource access module F.

As a preferred implementation of this embodiment, to realize a closed loop of network resource access, The user access module C is also used for receiving response information for the second access request from the resource access module F, converting the response information, and then reversely transmitting the converted response information to the user terminal A according to a transmission route of the first access request. Specifically, the user access module C acquires response information (for the second access request from the resource access module F, referred to as second response information), discards illegal response information (including fake or suspicious response information such as outdated or repetitive response information) from the response information, then acquires route information of the user terminal corresponding to the second response information according to a route opposite to the transmission route of the first access request, and obtains converted response information (referred to as third response information) according to the second response information and the obtained route information.

What is claimed is:

1. A distributed network resource security access management system, comprising: a policy management module, a user management module, a user access module, a resource management module, and a resource access module, wherein:

the policy management module is in a communication connection with the user management module, the user access module, the resource management module, and the resource access module, and is used for managing policy information for users to access network resources;

the user management module is used for managing user information and transmitting the user information to the policy management module;

the user access module acquires user information, resource access module information and policy information associated with the user access module, as well as a connection relation between the resource access module and the network resources, from the policy management module, receives a first access request for a target network resource initiated by a user by means of a user terminal, converts the first access request according to the connection relation to generate a second access request, and transmits the second access request to the corresponding resource access module;

the resource management module is used for managing the network resources and transmitting the network resource information and the connection relation between the network resources and the resource access module to the policy management module;

the resource access module acquires user access module information and network resource information associated with the resource access module from the policy management module, receives the second access request, converts the second access request to generate a third access request, and then sends the third access request to a target network resource server.

2. The distributed network resource security access management system according to claim 1, wherein the resource access module is also used for receiving response information returned by the target network resource server according to the third access request, converting the response information, and then reversely transmitting converted response information to the user access module according to a transmission route of the second access request;

the user access module is also used for receiving response information for the second access request from the resource access module, converting the response information, and then reversely transmitting converted response information to the user terminal according to a transmission route of the first access request.

3. The distributed network resource security access management system according to claim 1, wherein the user access module receives a first access request for a target network resource initiated by a user by means of a user terminal, and converts the first access request according to the connection relation to generate a second access request, specifically comprising:
receiving the first access request, and acquiring first access request information;
determining resource access module information and route information corresponding to the target network resource corresponding to the first access request according to the connection relation between the resource access module and the network resources under the condition where it is determined that the first access request is allowed to be accessed according to the policy information, and converting the first access request information according to the determined information to generate second access request information; and
generating the second access request according to the second access request information.

4. The distributed network resource security access management system according to claim 1, wherein the policy information consists of at least one access rule; and contents of the access rule determine whether the first access request is allowed or rejected according to one or more of user information, user access module information, target network resource information, resource access module information which is associated with the target network source, and current environmental information.

5. The distributed network resource security access management system according to claim 1, wherein the resource access module converts the second access request to generate a third access request, specifically comprising:
acquiring second access request information;
determining one or more contents of an actual address, a request method and a processing logic of the target network resource corresponding to the second access request according to the connection relation between the resource access module and the network resources, and converting the second access request information according to the determined one or more contents to generate third access request information; and
generating the third access request according to the third access request information.

6. The distributed network resource security access management system according to claim 2, wherein the policy information consists of at least one access rule; and contents of the access rule determine whether the first access request is allowed or rejected according to one or more of user information, user access module information, target network resource information, resource access module information which is associated with the target network source, and current environmental information.

7. The distributed network resource security access management system according to claim 3, wherein the policy information consists of at least one access rule; and contents of the access rule determine whether the first access request is allowed or rejected according to one or more of user information, user access module information, target network resource information, resource access module information which is associated with the target network source, and current environmental information.

* * * * *